March 17, 1925.
J. M. ALLEN
BATTERY GRID
Filed July 15, 1921
1,529,681
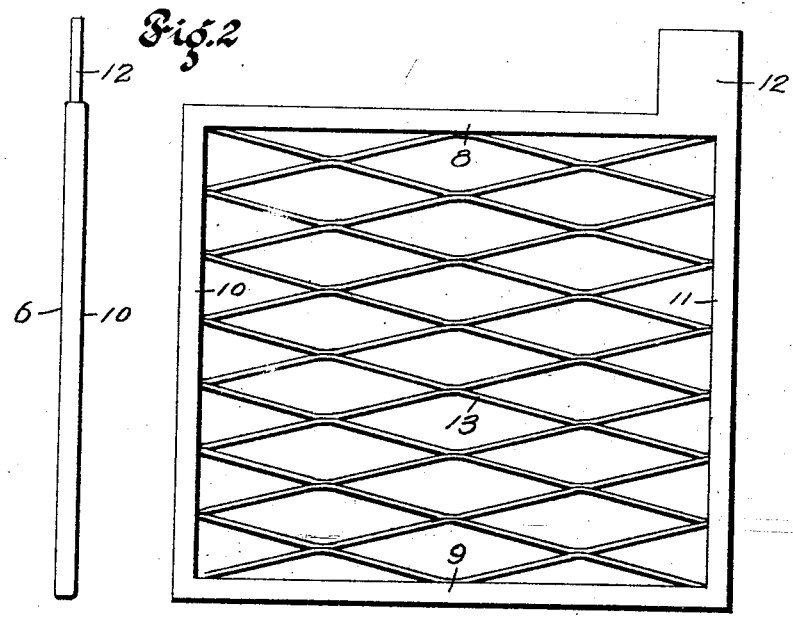
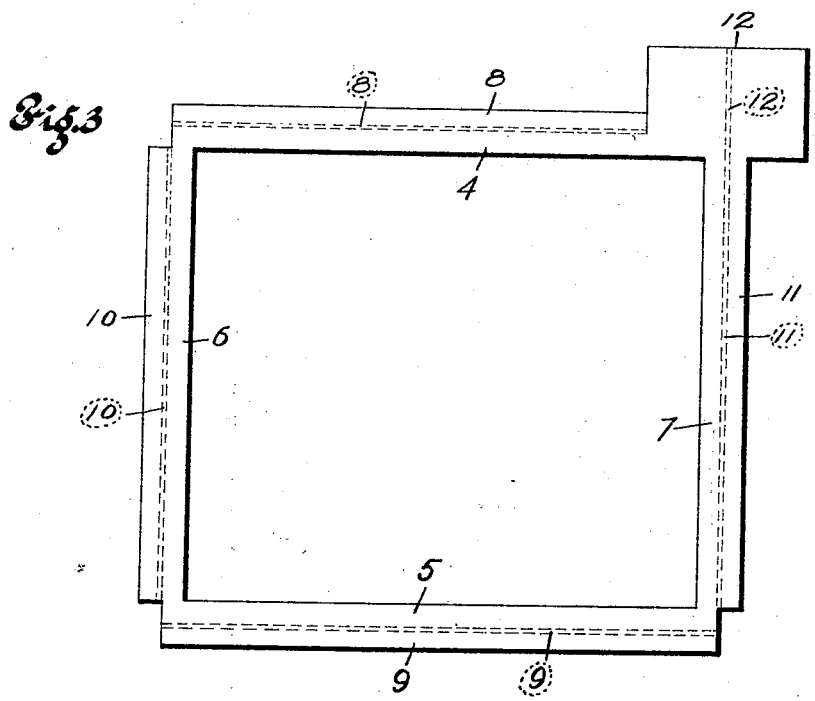
INVENTOR
JAMES M. ALLEN
BY Edward E. Longan
ATTY.

Patented Mar. 17, 1925.

1,529,681

UNITED STATES PATENT OFFICE.

JAMES M. ALLEN, OF ST. LOUIS, MISSOURI.

BATTERY GRID.

Application filed July 15, 1921. Serial No. 484,940.

*To all whom it may concern:*

Be it known that I, JAMES M. ALLEN, a citizen of the United States, and resident of the city of St. Louis, State of Missouri, have invented certain new and useful Improvements in Battery Grids, of which the following is a specification, containing a full, clear, and exact description, reference being had to the accompanying drawings, forming a part hereof.

My invention relates to improvements in battery grids and has for its primary object a grid which is composed of two parts, a frame and a grille work, the two being preferably stamped from sheet material and then assembled.

A further object is to construct a grid for storage batteries in which the grille for holding the active material is composed of expanded, reticulated metal or wire mesh and secured within a frame, thus eliminating defective grids which has been found the chief source of trouble where the grids are cast—in that the grille work is composed of such fine strips of metal that the metal is chilled before the mold is entirely filled. This causes many grids to be rejected and consequently increases the cost of the grid.

In the drawings,

Fig. 1 is a side elevation of my complete device before the active material has been applied.

Fig. 2 is an end elevation of the same.

Fig. 3 a plan view of the frame as stamped from a sheet of material.

In the construction of my device I employ a frame which is preferably rectangular in form. The frame has the upper and lower edges 4 and 5 and the side edges 6 and 7. The edges 4, 5, 6 and 7 are provided with flanges 8, 9, 10 and 11, respectively. Formed adjacent the edges 4 and 7 is a projection 12. This projection is adapted to form the connection to the crow's foot. After the frame has been stamped as illustrated in Fig. 3, the flanges 8, 9, 10 and 11 as well as one portion of the projection 12 are bent upward at right angles. This is illustrated by the dotted lines as at A, B, C, D and E in Fig. 3. I next place the grille 13 which may be constructed either of wire mesh, expanded or reticulated metal on the edges 4, 5, 6 and 7. The flanges are then crimped over the grille 13 and pressed downward thereon. The grid then assumes the form shown in Fig. 1 and in order to prevent any spreading of the frame or the projection 12, as well as to prevent shifting of the grille 13, the device is spot welded, thus forming practically a homogeneous mass. The grid is now ready for the active material and due to the peculiar construction of the grille 13, that is, the grille having more metal than the ordinary battery grid, the active material is capable of receiving a larger charge or being charged more thoroughly than is possible in the present type of construction. I may also if desired cast the frame, but in this event the flanges 8, 9, 10 and 11 as well as the portion of the projection 12 integral with the flange 11 would be formed at right angles to the edges 4, 5, 6 and 7; otherwise the construction is axactly the same as previously described.

I do not desire to limit myself to the precise construction of grille shown in the drawings as there are various other forms of reticulated sheet metal, or wire mesh which can be utilized and accomplish the same result as is accomplished by the grille construction as shown.

Having fully described my invention, what I claim is:

1. A battery grid comprising a reticulated sheet of conducting material, a U shaped frame formed of a single sheet of conducting material surrounding the reticulated sheet and extending inwardly around the margins of said sheet and on both sides thereof, and a projection formed integral with one of the edges of said U shaped frame.

2. A battery grid comprising a rectangular substantially flat grille work formed of sheet lead, a U shaped sheet lead frame formed of a single piece of sheet lead surrounding said grille work and extending inwardly for a short distance along the opposite faces of said grille work, and a projection formed integral with one edge of said frame, whereby said grid may be attached to the crow's foot of a binding post.

In testimony whereof, I have signed my name to this specification.

JAMES M. ALLEN.